Patented Apr. 2, 1929.

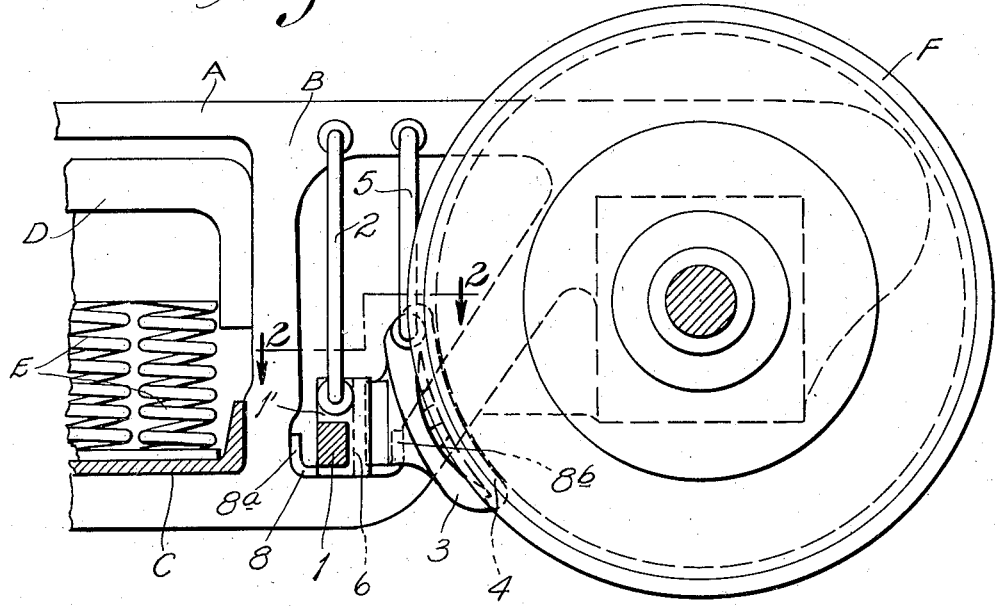

1,707,536

UNITED STATES PATENT OFFICE.

JOHN A. NUETZEL, OF EAST ST. LOUIS, ILLINOIS.

BRAKING MECHANISM FOR CAR TRUCKS.

Application filed March 28, 1928. Serial No. 265,358.

This invention relates to car trucks, and particularly to a car truck provided with braking mechanism including brake beams and brake heads which, when the brake shoes associated with the brake heads are not applied to the wheels of the car truck, are separate and disconnected and are provided with independent hangers or supports.

Prior to this invention, many car trucks were provided with braking mechanism, the brake beams and brake heads of which were connected together so as to provide a unitary structure, and ordinarily said unitary structure was supported by hangers which were connected to the brake heads and to the truck frame. This arrangement frequently resulted in great damage being done, particularly when a hanger or a brake head was broken while a truck was in motion, as it frequently happened that in either of these contingencies the brake beam came into contact with the ties of the road-bed whereby the damage referred to was occasioned. By providing the brake beams and brake heads with independent hangers or supports, the likelihood that a brake beam will contact with the ties and thus cause damage in the event of breakage of a hanger or of a brake head is greatly reduced.

Another object of the invention is to provide a car truck with means whereby the end portions of a brake beam are prevented from being forced into contact with wheels of the truck in the event brake heads located at said ends of said brake beam are broken or become dislodged from the truck.

Still another object of my invention is to produce a car truck having independently produce a car truck having independently supported brake beams and brake heads, which brake beams and brake heads are provided with co-operating portions adapted to provide joints which insure proper centering and positioning of said brake heads with respect to said brake beams and to the wheels of the truck when the brakes are applied.

Figure 1 is a fragmentary side elevation of a car truck made in accordance with my invention;

Figure 2 is a section on line 2—2 of Fig. 1;

Figure 3 illustrates a modified form of the joint between an end of a brake beam and the adjacent brake head;

Figure 4 is a modified form of the invention showing the manner in which the independent hanger for the brake beam is applied to a truck already in use.

Referring to the drawing, which illustrates one embodiment merely of my invention, A designates a car truck of ordinary construction, which includes the usual side frames B having the ordinary sand board C. D designates the bolster and E designates springs which are interposed between the bolster D and the spring seats. The truck A is provided with the usual wheels F which are associated with said truck in the usual and well-known manner.

1 designates a brake beam which is suspended from the side frames of the truck A by means of hangers 2, there being one of said hangers at each end of the brake beam, and each of said hangers being loosely connected at its opposite ends to a side frame and to the brake beam, respectively. The hangers 2 are preferably in the form of the links shown in the drawing, each of which is provided with eyes at its opposite ends to engage a side frame and the brake beam. The brake beam 1 is, of course, connected with the usual brake-applying mechanism, but as this mechanism is very well known and does not form a part of the present invention, the same has not been disclosed herein.

Associated with the end portions of the brake beam and arranged adjacent to the peripheral faces of the wheels F of the car truck A, are brake heads 3, each of which has a brake shoe 4 associated therewith in the usual manner. The brake heads 3 are entirely independent of and separate from the brake beam 1, as shown clearly in Fig. 2, and said brake heads are supported independently of said brake beam 1 by hangers 5, there being preferably one of said hangers associated with each brake head, and each of said hangers being provided with eyes at its opposite ends which loosely engage a side frame of the truck and a brake head, respectively.

The brake beam 1 at its opposite ends is provided with enlarged head portions 1', and formed in each of said enlarged head portions 1' is a perpendicular approximately V-shaped recess 6. In like manner, each of the brake heads is provided with an extension 7 which has a shape corresponding approximately to the shape of the recesses 6 in the enlarged head portions 1'. The extensions 7 are arranged perpendicularly on the brake heads 3 and are in horizontal alinement with the recesses 6 formed at the opposite ends of the brake beam so that when said brake beam is moved toward the brake heads, the extensions 7 will pass into the recesses 6. It is obvious that when the extensions 7 are moved into the recesses 6, the inclined walls of the extensions and the inclined walls of the recesses will contact with each other, whereby the brake heads will be centered so that they will occupy their proper positions relative to the end portions of the brake beam and to the peripheral faces of the car wheels of the truck.

Fixed to the opposite side frames of the truck and positioned immediately beneath the opposite end portions of the brake beam are opproximately U-shaped members 8, said members each being so arranged that its spaced side legs 8ª and 8ᵇ are extended upwardly, as shown in Fig. 1. The opposite end portions of the brake beam are interposed between the upwardly extended legs 8ª and 8ᵇ of the members 8, and said legs 8ᵇ of said members 8 function as stops to limit the forward movement of the brake beam, the opposite end portions of said brake beam contacting with said legs 8ᵇ when the brake beam has been moved a sufficient distance. The members 8 may be in the form of separate elements secured to the side frames of the truck, or said members may be formed as integral parts of said side frame.

In the use of a car truck made in accordance with my invention, the brake beam will be moved toward the wheels to which friction is to be applied on operation of the brake-applying mechanism, and as said movement of the brake beam takes place, the inclined walls of the recesses 6 at the opposite ends of the brake beam will contact with the inclined walls of the extensions 7 on the brake heads, whereby said brake heads will be centered and properly positioned with respect to the brake beam and to the car wheels. Continued movement of the brake beam will, of course, cause the brake shoes to be moved into contact with the peripheral faces of the car wheels, whereby friction will be applied to said car wheels. In the event one of the hangers 5 which is connected to one of the brake heads is broken, or if one of the brake heads is broken, so that same is disconnected from the associated hanger 5, the adjacent hanger 2 connected to the brake beam will hold the brake beam in its proper elevation position, whereby said brake beam is prevented from dropping downwardly where it may contact with the ties of the road-bed. Also, if one of the brake heads is broken or falls from the truck, the adjacent portion of the brake beam on being moved forwardly will contact with the upwardly extended leg 8ᵇ of the adjacent member 8 and the forward movement of the end portion of the brake beam will be arrested by said upwardly extended leg so that the enlarged portion of the brake beam will not be forced into contact with the wheels. In this manner, a major portion of the braking efficiency of the car on which the brake head is broken or from which it is lost, is maintained, as all of the other brakes will function in their usual manner, the breakage or loss of the one brake head not rendering the other brakes on the car ineffective, as would be the case if the end of the brake beam from which the brake head has been broken or lost were permitted to be forced into contact with the peripheral face of the associated wheel.

A feature of extreme importance in connection with the invention disclosed herein resides in the fact that the stresses which result when the brake shoes are moved into contact with the revolving car wheels to apply the brakes are not imparted to the hangers 2 by which the brake beam is supported. As a result of this fact the likelihood that the brake beam will be broken or dislodged from the car truck is very greatly reduced as it is these stresses which ordinarily caused the breakage or dislodgment of the brake beams heretofore.

Due to the fact that the recesses 6 and the extensions 7 are arranged perpendicularly, the brake head is capable of slight vertical movement with respect to the enlarged head portion 1' of the brake beam. Also, the portions of the enlarged head portions 1' of the brake beam 1 at the opposite sides of the V-shaped recesses 6 overlap the associated extension 7 on the brake heads a slight distance so that the brake head may not swing laterally a sufficient distance to get out of alinement with said enlarged head portions 1'.

In Fig. 3, I illustrate a modified form of the centering joint between the brake head and the brake beam. In accordance with this form of the invention, the brake beam 1ª is provided with approximately U-shaped portions 10 at its opposite ends, which U-shaped portions move into contact with and embrace a portion of the brake head 3ª in the manner illustrated by dotted lines in Fig. 3 when the brake is applied.

Figure 4 shows a modified form of the invention in accordance with which I employ separate supporting elements 12 for supporting the hangers 2ª. These supporting elements, only one of which is shown in Fig. 4 but of which there will be one at each end of the brake beam, are riveted or otherwise fastened to the sand board C' and extend forwardly therefrom. At the forward end of the portion of a supporting element which extends forwardly from the sand board C', said supporting element is extended upwardly as indicated at 12' and at its upper end said portion 12' is provided with an eye which receives the upper end of a hanger 2' It will be noted by referring to Fig. 4 that the supporting element 12 functions as a combined supporting element and stop to limit the forward movement of the end portion of the brake beam in the event the adjacent brake head is broken or dislodged from the truck; for said adjacent end portion of said brake beam will contact with the upwardly extended portion of said supporting element and its forward movement will be limited thereby.

I claim:

1. In combination with a car truck including side frames and car wheels, a braking mechanism comprising a brake beam, brake heads movable toward and from the peripheral faces of said car wheels, said brake heads being entirely independent of each other, joint portions on said brake beam and said brake heads arranged to be moved into contact with each other when said brake beam is actuated to move said brake heads toward said car wheels, and independent hangers for supporting said brake beam and said brake heads.

2. In combination with a car truck including side frames and car wheels, a braking mechanism comprising a brake beam, brake heads movable toward and from the peripheral faces of said car wheels, said brake heads being entirely independent of each other, overlapping joint portions on said brake beam and said brake heads arranged to be moved into contact with each other when said brake beam is actuated to move said brake heads toward said car wheels, and independent hangers for supporting said brake beam and said brake heads.

3. In combination with a car truck including side frames and car wheels, a braking mechanism comprising a brake beam, brake heads movable toward and from the peripheral faces of said car wheels, said brake heads being entirely independent of each other, overlapping joint portions on said brake beam and said brake heads arranged to be moved into contact with each other when said brake beam is actuated to move said brake heads toward said car wheels, and independent hangers for supporting said brake beam and said brake heads, said joint portions comprising depressed portions on said brake beam having inclined walls arranged to embrace portions of said brake heads, and the walls of said depressed portions being arranged to overlap portions of said brake heads to prevent said brake heads from moving out of alinement with said depressed portions on said brake beam.

4. In combination with a car truck including side frames and car wheels, a braking mechanism comprising a brake beam, brake heads movable toward and from the peripheral faces of said car wheels, said brake beam and said brake heads being entirely independent of each other, independent hangers for supporting said brake beam and said brake heads, and a stop to limit the movement of said brake beam toward said car wheels.

In testimony whereof, I have hereunto set my hand.

JOHN A. NUETZEL.